May 22, 1934.　　　　S. C. ANDREW　　　　1,959,807
DEVICE FOR BROWNING FOODS
Filed March 3, 1932
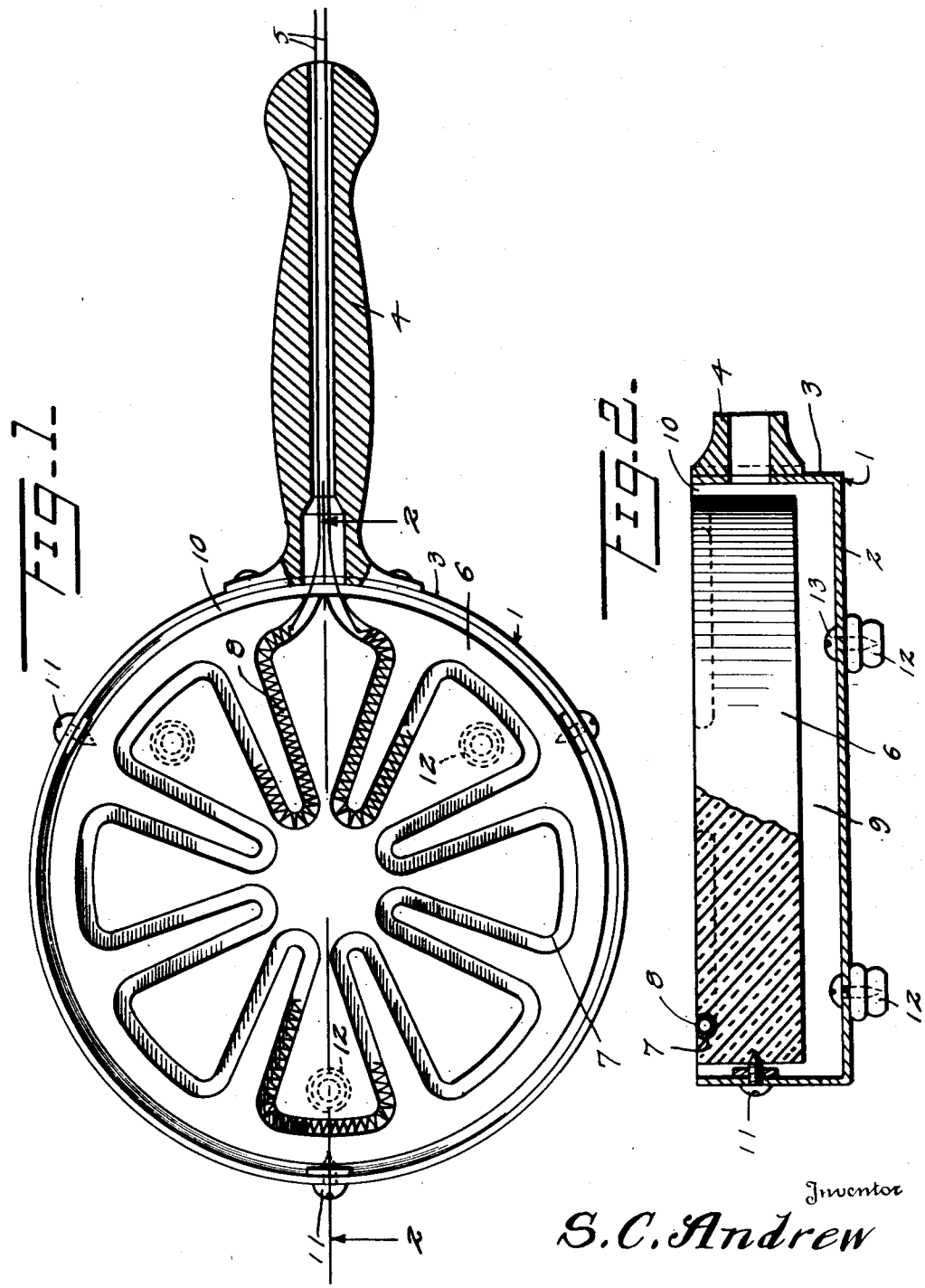
Inventor
S. C. Andrew
By Watson E. Coleman
Attorney Patented May 22, 1934

1,959,807

UNITED STATES PATENT OFFICE 1,959,807

DEVICE FOR BROWNING FOODS

Sarah C. Andrew, Allentown, Pa.

Application March 3, 1932, Serial No. 596,604

1 Claim. (Cl. 219—37)

This invention relates to improvements in cooking devices and pertains particularly to a device for browning foods in the nature of meringues, custards or the like.

The primary object of the present invention is to provide a hand device by which meringues, custards or other baked foods may be readily browned after the food has been removed from the oven.

At the present time in the case of meringue pies it is customary to apply the meringue after the pie has been cooked and then return the same to the oven for the browning of the applied meringue. This process requires great attention on the part of the operator. With the device embodying the present invention the pie may be completely cooked and the meringue browned without returning the pie to the oven simply by holding the present device over the top of the pie, the device being broadly in the form of an electric hot plate to which a handle is attached to facilitate the holding of the same over and in close proximity to the food. By this same means other foods may be readily cooked to brown the top surface thereof.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a face view of the device embodying the present invention;

Figure 2 is a sectional view taken on the line 2—2 of Figure 1.

Referring now more particularly to the drawing wherein like numerals of reference indicate corresponding parts throughout the several views, the numeral 1 indicates generally a shell which in the present instance is shown to be of circular formation and having a top wall 2 and a side wall 3, the entire bottom of the shell being open.

Attached to this shell is a handle 4 which is preferably of tubular design so that electric wires 5 may be readily passed therethrough and into the interior of the shell 1 as illustrated in Figure 1.

Within the shell 1 is a plate body 6 which is formed of a suitable heat retaining and non-conductive material, such for example, as clay or porcelain. The outer face of this body 6 is provided with a continuous tortuous channel or groove 7 in which is an electric heating or resistance coil 8 which is connected with the electric wires 5 in the manner illustrated. The outer or bottom face of this plate 6 is flush with the bottom edge of the wall 3 of the shell, while the inner side is spaced a substantial distance from the top wall 2 of the shell to form an air space 9. The overall diameter of the plate 6 is also considerably less than the interior diameter of the shell, thus leaving a surrounding air space 10 by means of which circulation of air will be maintained about the heating element and in the shell.

The heating element carrying plate 6 is held in the shell and concentric therewith by means of the pointed screws 11 which are threaded through the wall 3 of the shell and which have their inner ends forced into the edge of the plate 6 in the manner illustrated. By this means the plate 6 is suspended from three or more points from the wall 3 of the shell and is free of direct contact therewith.

When the device is not in use it is placed upon a supporting surface with the open side of the shell directed upwardly and in order to protect a supporting surface from damage in the event that the shell should become hot the top wall 2 has secured thereto the feet 12 by means of the screw members 13.

The normal operative position of the device herein described is with the resistance coil carrying face of the plate 6 directed downwardly toward the food to be browned and for this reason the open side of the shell has been referred to as the bottom thereof.

In practice, after the coil 8 has been made hot by allowing electric current to flow therethrough the device is lifted by the handle 4 and held with the face of the plate 6 directed downwardly and in close proximity to the meringue or custard or whatever food is to be browned, until the desired degree of brownness is attained.

While in the foregoing description the shell 1 has been described as being circular, and it has also been illustrated as being of this configuration, it is, of course, to be understood that the invention is not to be limited to a shell of this particular design as it will be apparent that square, octagonal, or any other shape of shell may be employed if desired.

Having thus described the invention, what is claimed is:—

A browning device of the character described, comprising a relatively flat shell body having a top wall and a side wall and having the bottom open, a disk body of insulation material of a thickness approximating more than half the depth of said body and disposed within the body with one face flush with the bottom edge of the body, pin members secured in the wall of the body and engaging the wall of the disk member, said disk member having the said flush face provided with a channel which opens at one point through the periphery thereof, a handle secured to the side wall of the body and having a passage extending therethrough and communicating with an opening in the side wall of the body, said passage and opening aligning with the opening of said channel through the periphery of the disk body, and an electric resistance heating element disposed in said channel and having its ends passing therefrom to and communicating with electric wires passing through said handle.

SARAH C. ANDREW.